(12) United States Patent
Belloni et al.

(10) Patent No.: US 8,872,487 B2
(45) Date of Patent: Oct. 28, 2014

(54) SCALABLE BUCK-BOOST DC-DC CONVERTER

(75) Inventors: Massimiliano Belloni, Pavia (IT); Piero Malcovati, Pavia (IT); Andrea Baschirotto, Tortona (IT); Cristiano Bazzani, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 34 days.

(21) Appl. No.: 13/596,404

(22) Filed: Aug. 28, 2012

(65) Prior Publication Data
US 2013/0070796 A1 Mar. 21, 2013

Related U.S. Application Data

(60) Provisional application No. 61/528,263, filed on Aug. 28, 2011, provisional application No. 61/565,701, filed on Dec. 1, 2011.

(51) Int. Cl.
*H02M 3/158* (2006.01)
*H05B 33/08* (2006.01)

(52) U.S. Cl.
CPC ......... *H02M 3/1582* (2013.01); *H05B 33/0866* (2013.01); *Y02B 20/346* (2013.01); *H05B 33/0815* (2013.01)
USPC .......................................... 323/271; 323/259

(58) Field of Classification Search
USPC .......... 323/225, 259, 271, 272, 284, 289, 350
See application file for complete search history.

(56) References Cited

U.S. PATENT DOCUMENTS

| 4,545,078 A | 10/1985 | Wiedeburg |
| 4,734,914 A | 3/1988 | Yoshikawa |
| 4,747,091 A | 5/1988 | Doi |

(Continued)

FOREIGN PATENT DOCUMENTS

| EP | 606161 | 4/2000 |
| EP | 1471671 | 12/2004 |

(Continued)

OTHER PUBLICATIONS

Keith Szolusha, "Linear Technology Design Notes DC/DC Converter Drives Lumileds White LEDs from a Variety of Power Sources—Design Note 340", Linear Technology Corporation, © Linear Technology Corporation 2004, date unknown, 2 pages.

(Continued)

*Primary Examiner* — Gary L Laxton
(74) *Attorney, Agent, or Firm* — Weide & Miller, Ltd.

(57) ABSTRACT

A DC-DC converter is disclosed having an input configured to receive an input signal and an output configured to present an output signal at a different voltage than the input signal. The converter also includes at least one inductor and at least one capacitor. Two or more transistors fingers are provided such that at least one of the two or more transistor fingers comprises two or more switching transistors, each of which has an input, an output, a control input. An activation controller connect to at least one of the two or more switching transistors, the activation controller configured to control whether the at least one of the two or more switching transistors is active or non-active. Also disclosed is a buck-boost converter with numerous controlled switches that establish the converter in either buck-boost mode, buck mode or boost mode.

17 Claims, 12 Drawing Sheets

(56) References Cited

U.S. PATENT DOCUMENTS

| | | | |
|---|---|---|---|
| 4,864,649 | A | 9/1989 | Tajima et al. |
| 5,019,769 | A | 5/1991 | Levinson |
| 5,383,208 | A | 1/1995 | Queniat et al. |
| 5,392,273 | A | 2/1995 | Masaki et al. |
| 5,394,416 | A | 2/1995 | Ries |
| 5,448,629 | A | 9/1995 | Bosch et al. |
| 5,812,572 | A | 9/1998 | King et al. |
| 5,900,959 | A | 5/1999 | Noda et al. |
| 5,978,393 | A | 11/1999 | Feldman et al. |
| 6,049,413 | A | 4/2000 | Taylor et al. |
| 6,292,497 | B1 | 9/2001 | Nakano |
| 6,535,187 | B1 | 3/2003 | Wood |
| 6,556,601 | B2 | 4/2003 | Nagata |
| 6,828,857 | B2 | 12/2004 | Paillet et al. |
| 6,836,493 | B2 | 12/2004 | Mahowald et al. |
| 6,909,731 | B2 | 6/2005 | Lu |
| 6,941,077 | B2 | 9/2005 | Aronson et al. |
| 7,206,023 | B2 | 4/2007 | Belliveau |
| 7,265,334 | B2 | 9/2007 | Draper et al. |
| 7,276,682 | B2 | 10/2007 | Draper et al. |
| 7,357,513 | B2 | 4/2008 | Watson et al. |
| 7,381,935 | B2 | 6/2008 | Sada et al. |
| 7,492,135 | B2 * | 2/2009 | Saeki et al. ............ 323/271 |
| 7,504,610 | B2 | 3/2009 | Draper |
| 8,080,988 | B2 * | 12/2011 | Hurtz et al. ............ 323/289 |
| 8,319,484 | B2 * | 11/2012 | Houston ................ 323/272 |
| 2001/0046243 | A1 | 11/2001 | Schie |
| 2003/0030756 | A1 | 2/2003 | Kane et al. |
| 2004/0032890 | A1 | 2/2004 | Murata |
| 2004/0095976 | A1 | 5/2004 | Bowler et al. |
| 2004/0202215 | A1 | 10/2004 | Fairgrieve |
| 2005/0185149 | A1 | 8/2005 | Lurkens et al. |
| 2006/0192899 | A1 | 8/2006 | Ogita |
| 2007/0058089 | A1 | 3/2007 | Wang |
| 2007/0081130 | A1 | 4/2007 | May et al. |
| 2008/0303499 | A1 | 12/2008 | Chen et al. |
| 2011/0001462 | A1 * | 1/2011 | Couleur et al. ............ 323/289 |
| 2011/0241636 | A1 * | 10/2011 | Wu et al. ................ 323/272 |
| 2013/0313996 | A1 * | 11/2013 | Williams ................ 315/291 |

FOREIGN PATENT DOCUMENTS

| | | |
|---|---|---|
| JP | 2001-119250 | 4/2001 |
| JP | 2004-045989 | 2/2004 |
| WO | 93/21706 | 10/1993 |
| WO | 02/063800 | 8/2002 |
| WO | 2004/098100 | 11/2004 |

OTHER PUBLICATIONS

"Power Management, LED-driver considerations" Analog and Mixed-Signal Products, Analog Applications Journal, www.ti.com/sc/analogapps, Texas Instruments Incorporated, © 2005 Texas Instruments Incorporated, Michael Day, 5 pages.

"Linear Technology LCT 3533 2A Wide Input Voltage Synchronous Buck-Boost DC/DC Converter", © Linear Technology Corporation 2007, 16 pages.

"National Semiconductor LM 3549 High Power Sequential LED Driver", © 2010 National Semiconductor Corporation, www.national.com, Aug. 3, 2010, 20 pages.

"TPS63020 TPS63021 High Efficiency Single Inductor Buck-Boost Converter With 4-A Switches", Texas Instruments, Copyright © 2010, Texas Instruments Incorporated, Apr. 2010, 28 pages.

* cited by examiner

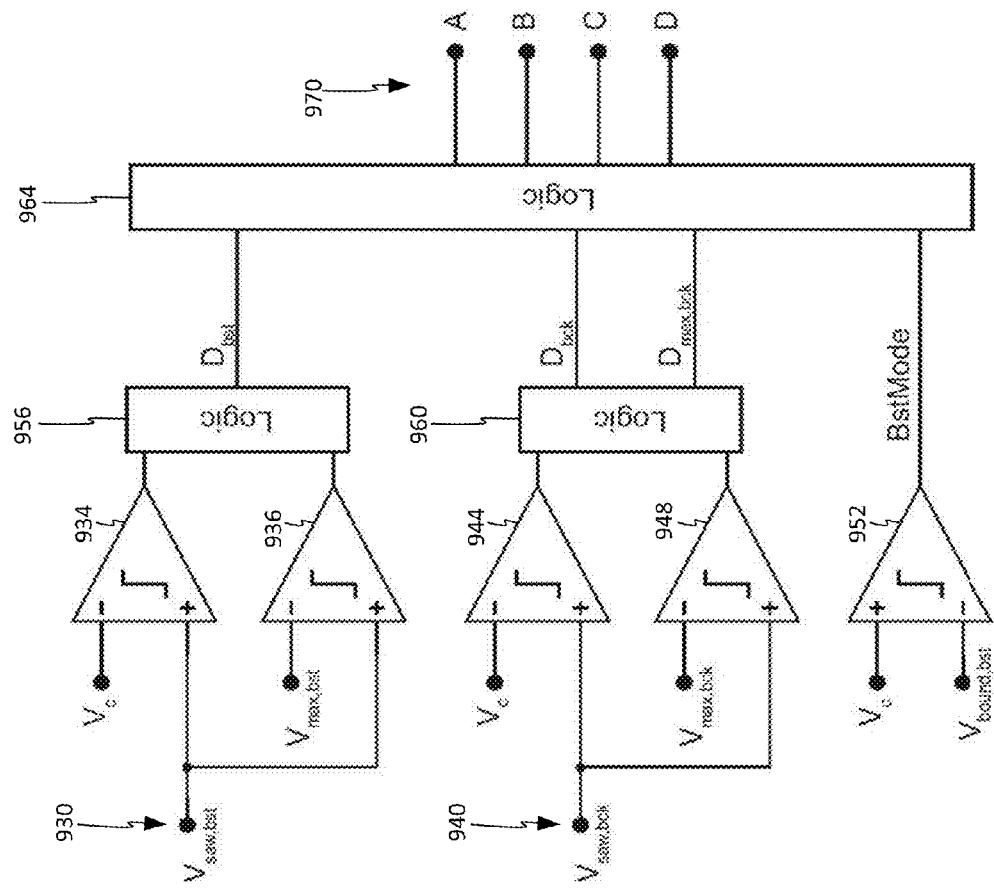
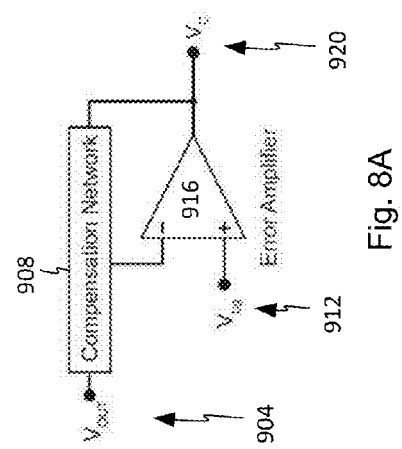
Fig. 8A
Fig. 8B

SCALABLE BUCK-BOOST DC-DC CONVERTER

PRIORITY CLAIM

This application claims priority to and the benefit of U.S. Provisional Application No. 61/528,263 filed Aug. 28, 2011 entitled Scalable Buck-Boost DC-DC Converter and U.S. Provisional Application No. 61/565,701 filed Dec. 1, 2011 entitled Scalable Buck-Boost DC-DC Converter For Light Source Drivers.

FIELD OF THE INVENTION

The invention relates to DC-DC converters and in particular to a method and apparatus for power efficiency improvement and improved transition control between buck-boost mode, buck mode and boost mode.

RELATED ART

The electronic devices, circuits, and sub-systems within an electronic device may require different voltage to achieve desired operation. For example, within a portable electronic device, the analog systems may require a different supply voltage than the digital systems. Likewise, different analog devices may require different voltage for operation. By way of example, the analog power amplifier may require a 3.2-V supply voltage while a digital portion of the device may only require 1.8 V. Likewise, in sequential projector systems, light sources, such as light emitting diodes (LEDs) or lasers, of multiple colors (typically red, green and blue) are required. Each light source requires a different voltage for efficient operation.

In portable devices batteries are used as a source of power. Batteries often supply a voltage of 2.7 to 4.2 V (Li-Ion batteries), while individual cells often supply 1.5 V per cell. To satisfy the various different voltage level requirements within a portable or battery powered electronic device, it is necessary to convert the voltage levels from the battery, or other source, to the desired voltage level utilized by the electronic systems. Even when the system is operated using a power adaptor from a wall plug the standard input voltage from the adapter (typically 5 V or 12 V) needs to be converted to the proper voltage level.

Switching DC-DC converters are a common type of voltage conversion device within electrical devices, particular battery powered devices. DC-DC converters convert a source voltage, such as a battery voltage $V_{bat}$, to a different value. As discussed above, in numerous battery powered devices the circuitry of the device may require a voltage above battery voltage and below battery voltage. To meet these needs, the switching DC-DC converter may be configured as a buck-boost converter. A buck-boost converter increases the source voltage when established in boost mode and decreases the source voltage when established in buck mode. These output voltage may be provided to the components of the circuit as required to achieve desired operation.

In electronic system the load voltage may vary over time, in which case the converter must dynamically transition between buck mode and boost mode depending on the needs of the circuit. Further complicating this process is the fact that over time the supply voltage, such as $V_{bat}$, may vary as the charge of the battery ranges from a fully charged state to a low charge state (4.2 V to 2.7 V typically in a Li-Ion cell). A dynamic transition algorithm must accurately control the transitions between buck mode and boost mode in light of changing load conditions and a supply voltage $V_{bat}$ which changes over time. The challenge is particularly acute when the input voltage or output load requirements are close to a transition threshold.

If the transition control for buck mode and boost mode is not accurately executed, then the resulting output power may not meet the load requirements, power efficiency may suffer, or increased output ripple is introduced into the output voltage. All of these factors negatively affect circuit operation.

Power efficiency is also of paramount importance for all electronic devices and in particular for battery operated devices. As can be appreciated, power efficiency is important to conserve power and reduce heat generation. For battery powered devices, power efficiency is directly related to the amount of time the device may operate before a battery charge is required. This is of great importance.

The power efficiency of a DC-DC converter is the ratio between the power delivered to the output load and the power absorbed from the input supply. In order to improve the power efficiency, the converter power losses must be minimized The power losses can be characterized as either DC losses or AC losses.

The DC losses, or conduction losses, are proportional to the square value of the current and are mainly affected by the on-resistance of the power MOS switches, the series resistance of the output filter inductor, the duty cycle and the inductor output filter current ripple. In contrast, the AC losses, or switching losses, are to proportional to the converter switching frequency and are mainly due to the charging/discharging of the parasitic capacitance at the power MOS switch gates and at the switching node.

Since the AC losses do not depend on the current flowing into the power devices and power train, the AC losses are dominant at light-load condition, while the DC losses are dominant at heavy-load condition. One aspect of the innovation described below is an improvement in power efficiency by reducing AC losses during periods of light load, such as during periods of low current draw without degrading operation during periods of high current draw and without significantly increasing DC losses.

The innovation disclosed herein overcomes the drawbacks in the prior art, which are set forth above, and provides additional advantages over existing prior art solutions.

SUMMARY

To overcome the drawbacks of the prior art and provide additional benefits a DC-DC converter is disclosed that comprises an input configured to receive an input signal and an output configured to present an output signal at a different voltage than the input signal. This converter also includes at least one inductor and at least one capacitor. Two or more trans istors fingers are provided such that at least one of the two or more transistor fingers includes two or more switching transistors, each of which has an input, an output, and a control input to receive a control signal. An activation controller is also part of this embodiment and is configured to connect to at least one of the two or more switching transistors. The activation controller is configured to present a control signal to the control input of the one or more transistors such that the control input determines whether the at least one of the two or more switching transistors is active or non-active.

In one embodiment the activation controller is responsive to a load current drawn from the DC-DC converter. In one configuration the two or more switching transistors are cascaded and have outputs connected to subsequent inputs to thereby form a chain of switching transistors. The DC-DC converter may further comprise at least one switch configured to receive the control signal and responsive to the control signal selectively provide an activation signal to at least one of the two or more switching transistors. The DC-DC converter may also further comprise an optic signal generators connected to the output such that the optic signal generator drawing a current to create a variable load. In one embodiment the current detector is configured to detect a load current and provide a load current indicator signal to the activation controller.

Also disclosed is a DC-DC converter, comprising an input configured to receive an input signal at a first voltage and an output configured to present an output signal at a second voltage. The second voltage is different than the first voltage. A part of this embodiment is an inductor and capacitor. More inductors or capacitors may be provided. A switching system is part of the converter and is configured to control the second voltage presented at the output. The switching system comprises one or more transistors fingers, such that each finger includes one or more transistors. Each transistor has a transistor input and a transistor output, The finger also includes one or more switches and at least one transistor receives the input signal. A controller connects to at least one of the one or more switches and the controller is configured to control whether at least one of the one or more switching transistors is active or non-active.

In one embodiment the switch includes a switch input, a switch output, and a control signal input such that the switch is configured to receive a switch control signal from the controller, and responsive to the switch control signal, present a transistor control signal at the switch input to the switch output. The converter may further comprise a current detector configured to provide a load demand signal to the controller, such that the load demand signal determine the number of transistors which are active. The system may further comprise a junction connecting to the transistor outputs of the one or more transistors. In one configuration the controller is configured activate additional transistors in response to increased load.

Also disclose herein is a method for providing an output signal in response to a variable load. This method includes monitoring a load to establish a load demand signal and processing the load demand signal to generate one or more switch control signals. Then presenting the switch control signals to one or more switches and responsive to the one or more switch control signals, selectively switching a transistor activation signal to connect to one or more transistors to thereby activate the one or more transistors receiving the transistor activation signal. Then responsive to the transistor activation signal, activating the one or more transistors receiving the transistor activation signal to generate one or more transistor output signals. This results in the transistor outputs signals which are received and combined the one or more transistor output signals at a common node to create an output signal. The method then presents the output signal to the load.

This method may further comprise detecting a current at the load with a current detector and processing a current detector output to generate the switch control signals. In one embodiment a processor or control logic generates the one or more switch control signals. The load may comprise a light emitting diode or a laser. The transistor activation signal may comprise a signal that activates a transistor and when presented to one transistor of the one or more transistors activates the one transistor to increase power of the output signal. In one configuration in response to increased load demand, additional transistors are activated.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8A illustrates an example embodiment of compensation network and error amplifier arrangement configured to generate a control signal.

FIG. 8B illustrates an example embodiment of a switch control circuit.

DETAILED DESCRIPTION

Figure 1A:
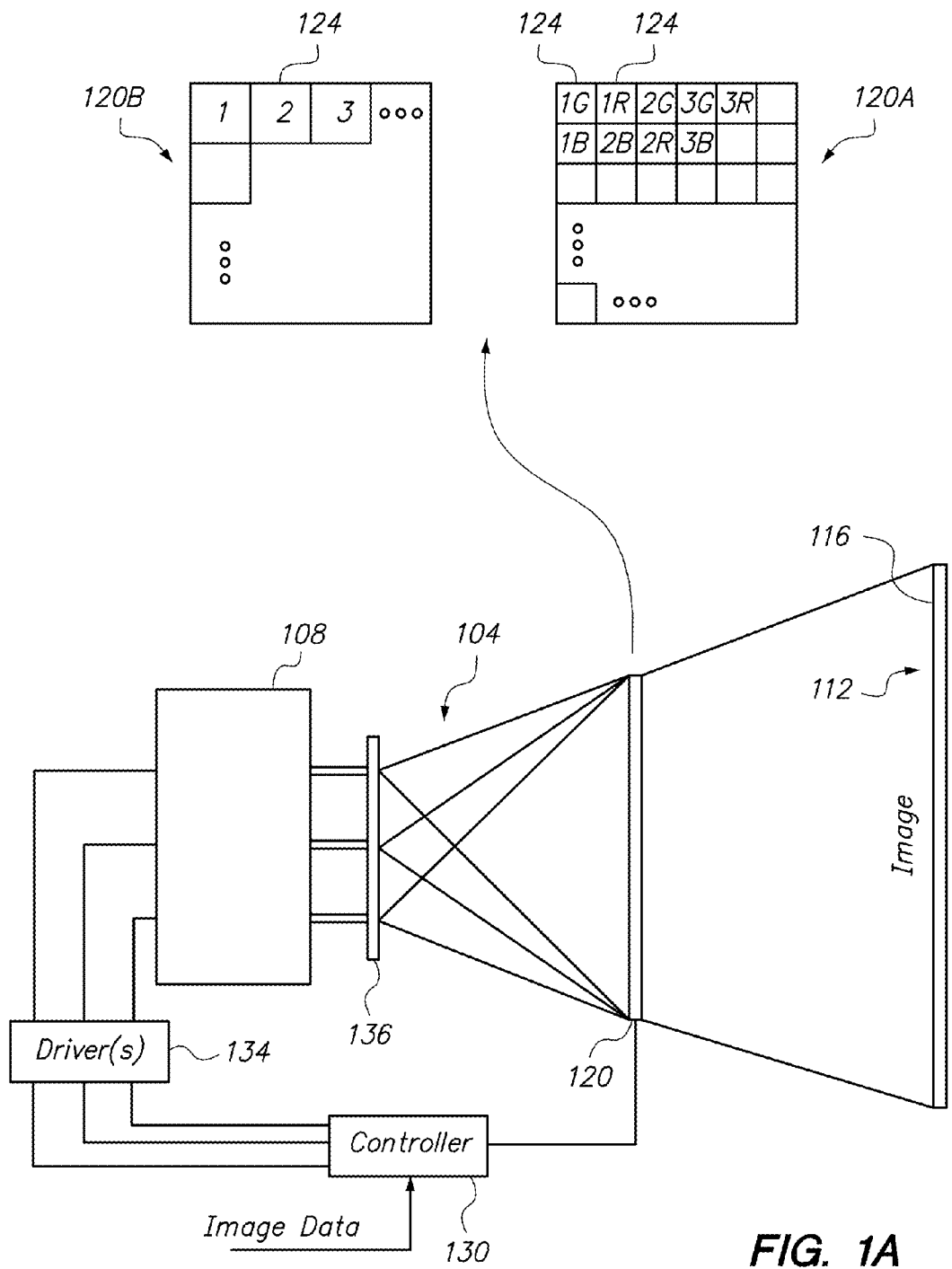
FIGS. 1A and 1B illustrate an example environment of use of the current driver disclosed herein.
Figure 1B:
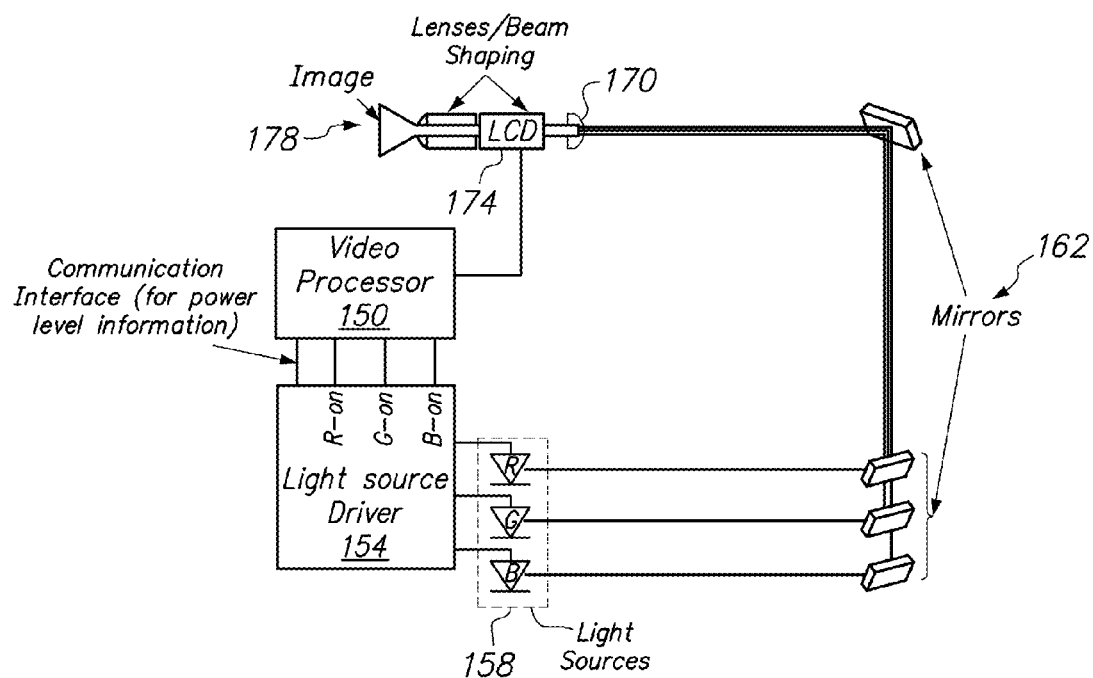

FIGS. 1A and 1B illustrate an example environment of use of the innovation disclosed herein. This is but one possible environment of use. It is also contemplated that the innovation may be used in any other environment which would benefit from the features set forth herein. Alternative environments of use include but are not limited to laser printers, CD or DVD writers, or any other application having a DC-DC converter.

In this example environment of a projector system, a light signal 104 is generated by 3 light sources 108, such as a red light source, green light source and blue light source. In other embodiments, different number of light sources may be utilized. The light sources 108 may comprise a laser, LED, or any other light source. The output of the light sources is provided to an optical system 136. In this embodiment, the optical system 136 comprises one or more lenses, mirrors, or both. The optical system 136 directs or focuses the light to a pixel matrix 120. The optical system 136 may be passive or active. The image 112 is created by shining on and filtering these colors through the pixel matrix 120. In one embodiment, the pixel matrix 120 is an LCD/LCoS system. In other embodiments it can be a DLP engine. The pixel matrix 120 is a matrix of pixels 124 where each one can be made transparent or opaque to light, or some level of opaqueness between transparent and opaque. The projected image 112 is created by shining through or blocking (selectively for each pixel) the light from the light sources 108. The resulting image 112 may be projected onto a viewing screen 116. Multiple pixel matrixes (LCD/LCOs screens) may also be used in some embodiments (for example one per color).

A controller 130 provides control signals or low power output to one or more drivers 134. The drivers 134 in this example environment of use may benefit from the current driver configuration and control algorithms shown below in FIGS. 2-8 and discussed in the related text. The one or more drivers 134 amplify the signal(s) from the controller 130 to a level suitable to power the light sources 108. In one embodiment the drivers 134 and controller 130 (or processor) are combined into a single integrated circuit. The controller 130 also connects to the pixel matrix 120 to provide one or more control signals to these devices. In this example embodiment, the controller 130 receives image data although in other embodiments it is contemplated that other type data may be sent to the controller. The one or more control signals are sent to the pixel matrix 120 to control the opaqueness of each pixel during different time periods and/or frames. The term opaqueness is defined to the mean the amount of light which is allowed to pass through a pixel 124 in the pixel matrix 120.

It is contemplated that the pixel may be clear, allowing 100% of the light to pass through (disregarding possible losses in the matrix itself), or opaque, allowing none (or very little) of the light to pass through, or any level of opaqueness there between to allow varying levels of light to pass through each pixel 124 of the pixel matrix 120.

The one or more control signals to the light sources 108 may control the intensity, duration, or other factor regarding the light emitted from the one or more light sources. It should be noted that in this example embodiment, the light sources are not on all at the same time and as such each of the 3 light sources is on for one third of the duration of a frame. The slow reaction time of the human eye is such that each frame is perceived in full color even thou the colors (light sources) are turned on in sequence.

Similar principles as described herein may be applied to a scanning system. The following discusses laser, or any light source, projection systems which scan the image and it is hereby incorporated by reference in its entirety herein: Application Publication Number 20080055557 entitled Method and Apparatus for Controllably Modulating a Laser in a Laser Projection Display. This publication discusses a scanning type projection system.

At the top of FIG. 1A are two example pixel matrixes 120A and 120B, either of which could be utilized. These pixel matrixes are in the light path between the light sources 108 and the screen 116. In the pixel matrix 120 shown at the top of FIG. 1A, the part 120 has been rotated 90 degrees to aid in understanding of the pixel screen. In this example embodiment intended for purposes of discussion, the pixels 124 in the pixel matrix which correspond to the first pixel on the viewable image 112 are labeled '1'. The pixels for the second pixel on the viewable image 112 are labeled '2'. As can be appreciated, in this embodiment, the pixel matrix 120A has three pixels 124 for each pixel in the viewable image. In this embodiment, each pixel 124 is assigned to a light source color, such as red, green and blue and is thus controlled during the time period when that light source is emitting light. At other times, it may be opaque, to hinder or prevent light from passing through.

In one embodiment, as shown in pixel matrix 120B, there is a one to one correspondence between the pixels on the pixel matrix 120 and the pixels of the image 112. Each pixel 124 is separately controlled for each period of the frame. For example, if the frame time is divided into 3 time windows, one window for each of Red, Green, Blue, then the opaqueness of each pixel 124 would likely be different during each of the three time windows depending on the intensity and color for that pixel for the frame. As such, the opaqueness of each pixel 124 is controlled during the frame to allow the desired amount of light of each color to pass. The eye will tend to blend this light to create the actual desired color. It is contemplated that other methods of selectively allowing light to pass through the pixel matrix 120 may be developed which does not depart from the claims.

FIG. 1B illustrates an alternative embodiment of the light source and pixel matrix controller. This is but one example possible environment of use. In this embodiment a video processor 150 generates, processes, or receives image data which is used to create an image. The video processor 150 outputs the image data to a light source driver 154 as shown. In this embodiment, the transfer occurs over a communication interface that includes power level information. The light source driver 154 also receives a feedback input from a photodetector 166, which is discussed below in more detail. It is contemplated that the drivers and controllers 134, 130, 150, 154 may benefit from the DC-DC buck boost converter and the described method of operation as described below.

The light source driver 154 outputs drive signals to light sources 158 as to shown. In this embodiment, there are three light sources tuned to red, green, and blue colors. In other embodiment, more or fewer light sources may be utilized. The lights sources 158 generate light output, which is directed to one or more mirrors 162 as shown, or directly to lenses or beam shaping apparatus. Although shown in a common cathode configuration, it is contemplated that the driver 154 or light sources 158 could be arranged in a common anode configuration.

The lenses or beam shapers 170 focus the light from the minors 162 through an LCD 174 or other light intensity control unit. Light passing through an LCD 174 may pass through additional lenses or beam shapers 170 before forming an image 178. Other embodiment may not include the minors, which are optional.

Given the fact that the projector is portable it may be imperative to use any possible technique to improve power efficiency. This disclosure details a technique to significantly improve power efficiency of the DC-DC converter and improve the transition strategy for selecting between buck-boost mode, buck mode, and boost mode.

Power Efficient DC-DC Converter

Figure 2:
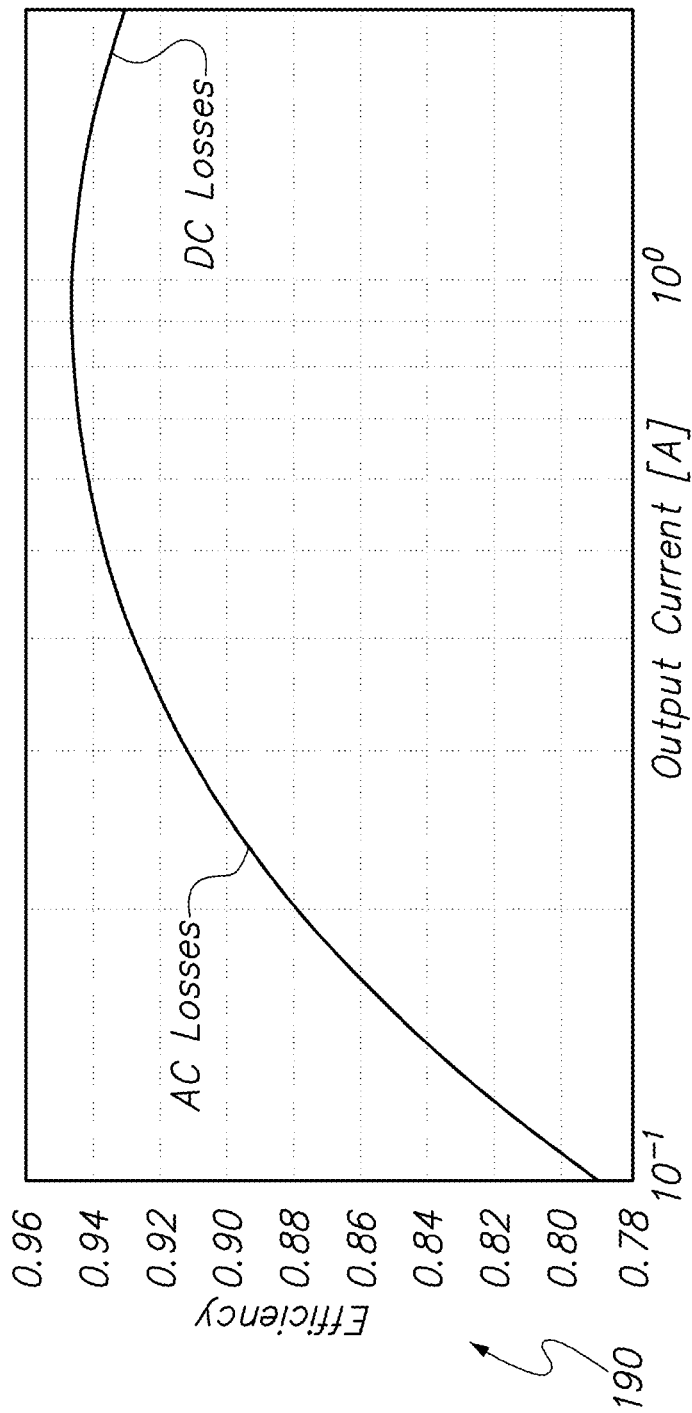
FIG. 2 illustrates an example plot of power efficiency as a function of output current.

FIG. 2 illustrates an example plot of power efficiency as a function of output current. In this plot, efficiency is on the vertical axis 190 while output current is shown on the horizontal axis 194. As shown in this plot, the AC losses reduce efficiency at low output currents while the DC losses dominate the reduction in efficiency for high output current. Typically, to increase the light-load power efficiency, low-power control modes such as PFM (pulse frequency modulation) or skip pulse mode are activated when the output current falls below a threshold value.

The AC losses occur both with high current load and low current load. AC losses are not a function of output power, but result from the operation of the FETs or other switching devices within the DC-DC converter. As it is understood, a FET inherently includes a gate capacitance and before a FET, acting as a switch, may turn on or enter conductive mode, its gate capacitance must be charged. Hence, each switch operation of the FET consumes power, and this power consumption is dependant on the size and nature of the FET and not on the current flowing through the FET.

Figure 3:
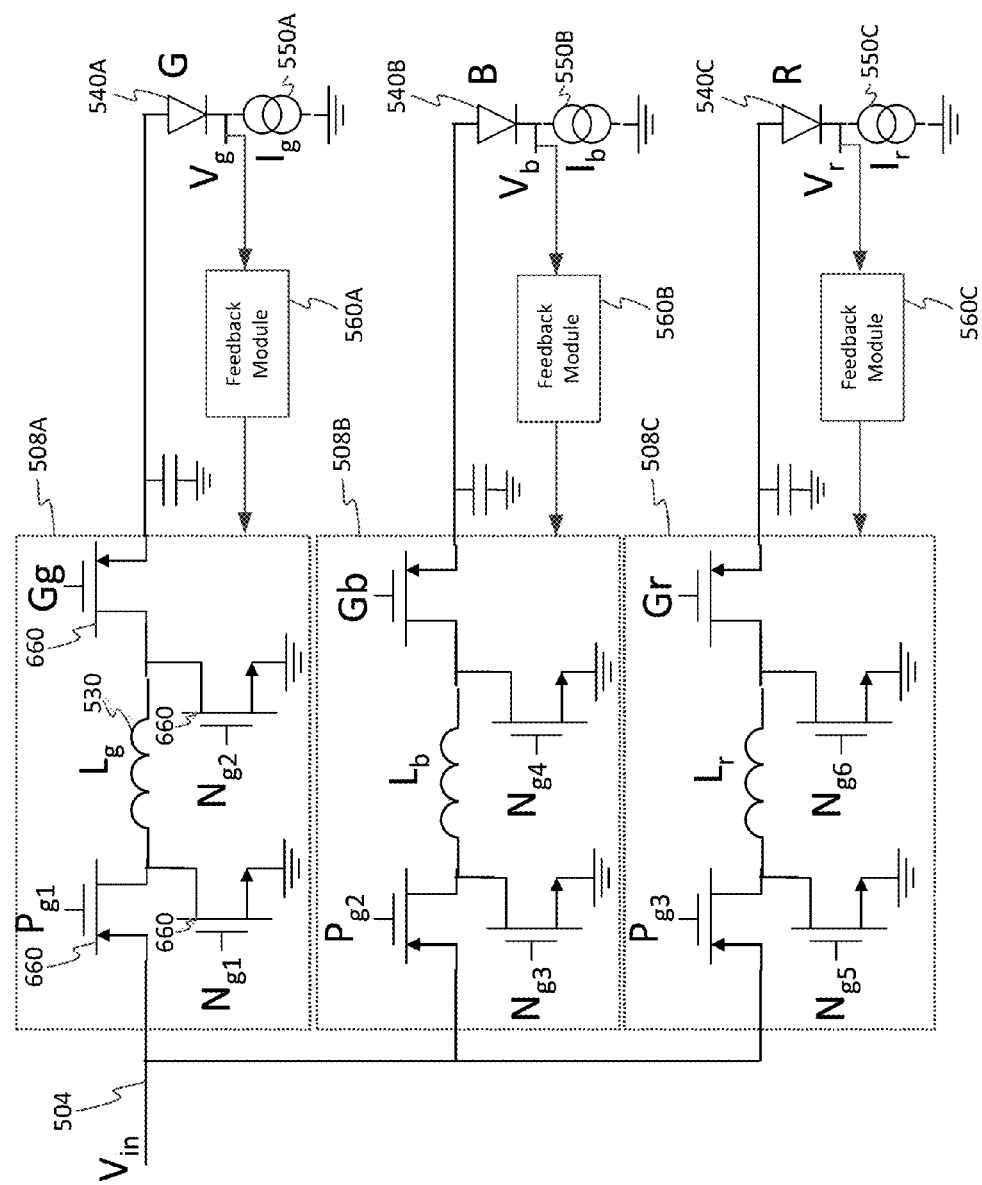
FIG. 3 illustrates an example embodiment of a DC-DC converter paired to a projector system.

FIG. 3 illustrates an example embodiment of a DC-DC converter paired to a projector system, such as a pico-projector system. This figure is provided to show an example environment of use and illustrates the numerous switching FETs which may be found within an exemplary simplified DC-DC converter, including the DC-DC converters interaction with the light sources and drivers.

In DC-DC converter and projector system shown in FIG. 3, the DC-DC converter and light source components are configured with a DC-DC converter 508A, 508B, 508C associated with each light source 540A, 540B, 540C. In the system of to FIG. 3, a voltage $V_{in}$ is provided on an input 504 which provides the voltage $V_{in}$ to dedicated DC-DC converters 508A, 508B, 508C (jointly 508) associated with each channel. The DC-DC converters 508 may perform current or voltage step down or step up to suit system design. In this application the DC-DC converters 508 may comprise switching DC-DC converters and operation in connection with the current source drivers 550 (discussed below) to adjust the input voltage $V_{in}$ to the needs of the light sources described below. The drivers 550 will control current sourced from each DC-DC converter 508. The DC-DC converters 508 and drivers 550 may be integrated on a single integrated circuit and share control and load information. The DC-DC converters 508 also minimizes voltage drop. In this example embodiment the DC-DC converter 508A is part of the channel that generates the green light signal. The DC-DC converter 508B is part of the channel that generates the blue light signal. The DC-DC converter 508C is part of the channel that generates the red light signal.

As part of this embodiment a feedback path is also provided. The feedback path connects the DC-DC converter 508 to the node between the light source 540 and driver 550. The feedback path includes a feedback module 560A-560C which receives as an input the cathode voltages signals Vg, Vb and Vr for the light sources 540. The feedback modules 560 process the cathode voltages for the light sources 540 to generate control signals which are output to the DC-DC converters 508 as shown. The control signals from the feedback modules 560 control the DC-DC converter output voltage based on the minimum headroom necessary for the driver 550 to operate properly. The feedback modules 560 evaluate the received voltages to Vg, Vb, and Vr in relation to the minimum headroom and output control signals to the DC-DC converters 508 to control the corresponding gates of the DC-DC converter switches.

The DC-DC converters 508 each include an inductor 530 and other associated transistors 660 such as NFETs and PFETs as shown. The NFETs and PFETS are controlled by control signals presented to the gate of each respective FET. Any type switch element may be utilized in place of the FETs. The inductor 530 is a common element within the DC-DC converter and operation is understood in the art. In this embodiment, the system has a DC-DC converter 508 and associated inductor 530 for each channel.

The output of each DC-DC converter 508 connects to or is provided to a light source 540A, 540B, 540C. The light sources 540 may comprise any light source as disclosed, described herein, or would be understood by one of ordinary skill in the art. As described above, the light sources 540 generate light of different colors which are combined to generate the image. For example, the light sources 540 may be multiplexed or otherwise controlled to generate the light signal which forms the image. The opposing terminal of the light source 540 connects to a current source driver 550A, 550B, 550C as shown. To achieve desired operation of the drivers 550 and light sources 540, sufficient voltage and current sourcing capability must be present between the light source and the drivers for the drivers to generate or pull the amount of current to turn on the light sources, i.e. generate light. In one embodiment, a control signal (not shown in FIG. 3) is provided to the driver 550 to control the output and intensity of the light source 540.

Figure 5:
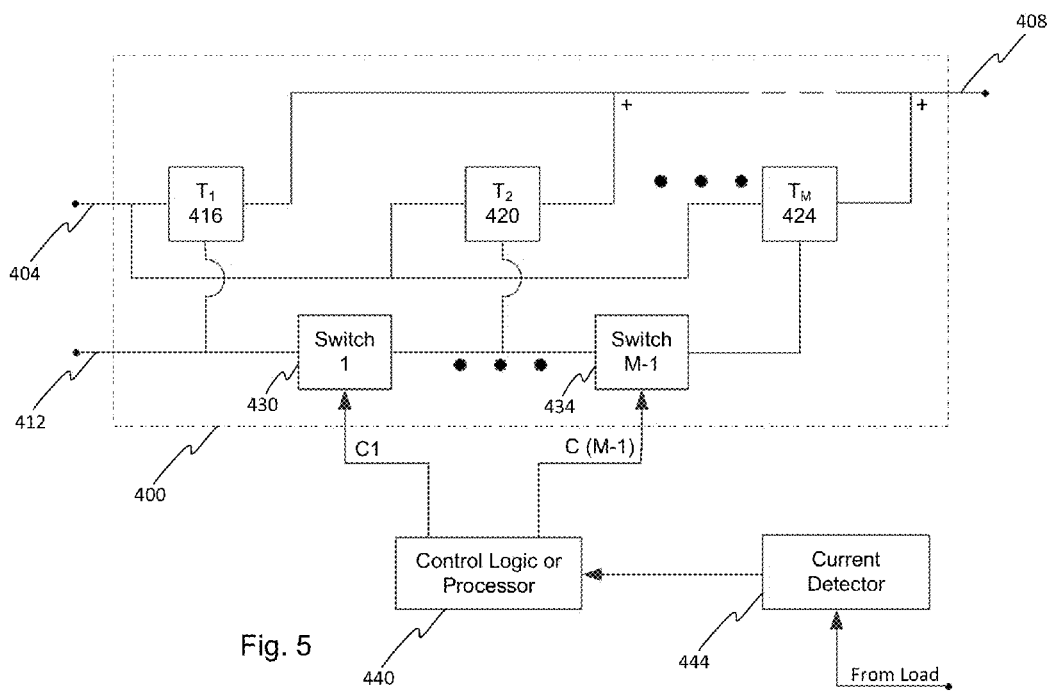
FIG. 5 illustrates an example embodiment of a transistor finger.

A cathode voltage for each light source 540 is identified on FIG. 5 as $V_g$ for the green light channel, $V_b$ for the blue light channel, and $V_r$ for the red light channel.

Given the fact that the projector is portable it is preferred to use any possible technique to improve power efficiency and to do that the switching DC-DC converters 508 are employed to selectively control the operation and the current output of each DC-DC converter 508 to match the amount of current which will be drawn from the DC-DC converter by the drivers 550. In one embodiment thus depends on the light intensity output for each for each light source, which will vary over time and in response to color mixing.

It is contemplated to integrate the DC-DC converter 508 with the driver 550 to thereby allow for the sharing of data or information between these devices. In one embodiment, each of the DC-DC converters 508 is always on, such that the FET switches that are part of the DC-DC converter are always switching to provide sufficient current to each capacitor and light source 540 according to each particular light source's voltage and current requirements based on the time multiplexed scheme for each light source. This may occur as part of a color mixing arrangement where more than one light source is on at a time to increase image brightness. Hence, the DC-DC current may be continually switching to establish output current, even when the output current is much less than maximum. This constant switching consumes power, and as discussed above, efficiency is reduced if current output from the DC-DC converter is less than at or near maximum.

In DC-DC converters, such as that shown in FIG. 3, the FET switches are sized to accommodate maximum predicted current output for the DC-DC converter. As a result, a larger FET is capable of sourcing and passing this maximum expected current flow. Accordingly, large FETs have an associated gate capacitance that is relative to the size of the FET device, and thus a large FET consumes more power to charge the FET's gate capacitance before the FET enters conduction mode, as compared to a smaller FET, which features a smaller gate capacitance, but is not able to pass or source as much current flow. As a result, DC-DC converters which are sized to source a particular current output minimize the relative contribution of their AC losses when operating at or near maximum output current. However, at less then maximum current output, the AC losses associated with charging the large gate capacitance of the FET, which was sized to source larger current flows, dominate the losses thereby reducing power efficiency.

To increase power efficiently one or more large transistor switches of a DC-DC converter are replaced by two or more smaller transistor switches (arranged in banks or fingers) and are selectively controlled in relation to the current draw or load on the DC-DC converter based on a control signal or feedback mechanism. During periods of high current draw, such as at or near maximum load, all of the transistor switches (which replace a single large transistor) are active to meet the load current demand.

However, during periods of moderate load, fewer than all of the transistor switches within the bank or finger are active. Because not all of the transistor devices are active, the cumulative gate capacitance which must be charged is reduced, and therefore, the overall switching operation of the transistors consumes less power, as compared to the case in which a single large transistor switch is configured or all of the smaller transistor switches are active. Thus, at less than maximum or less than near maximum load, power efficiency is increased. As load is decreased, fewer of the transistor switches are active, thereby matching the number of active transistor devices to the load drawn from or sourced by the DC-DC converter.

In one embodiment a voltage or current detector monitors the load current or output current from the DC-DC converter. This detected output current is compared to one or more current thresholds, and responsive to this comparison, a preferred number of transistor devices are selectively switched into or out of active operation. In one embodiment, logic or other control circuitry performs the activation and deactivation of the transistor switches, based on a priori knowledge of the load current value, without a comparison to a predetermined threshold.

Figure 4:
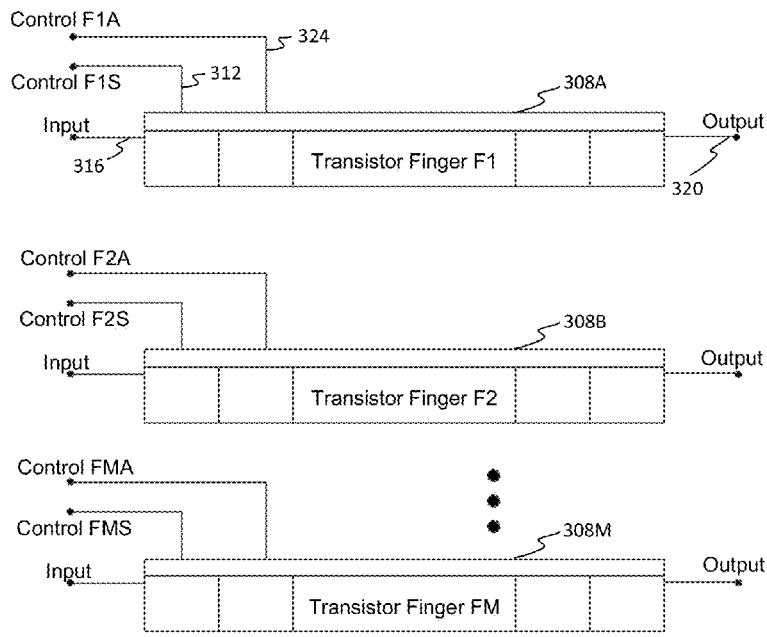
FIG. 4 illustrates a block diagram of multiple transistor fingers as may be configured within the DC-DC converter.

FIG. 4 illustrates a block diagram of multiple transistor fingers as may be configured within the DC-DC converter. Each transistor finger 308 replaces a transistor as shown in FIG. 3 within the DC-DC converter. Each transistor finger 308 may have the same or similar current sourcing capability as a larger transistor it is replacing but be divided internally into multiple individually controllable transistors. FIG. 5, discussed below, illustrates this in greater detail.

In the example embodiment of FIG. 4, the transistors within each finger 308 are configured as switching transistors, such as FETs and have a switching control input 312 which controls the switching connectivity or conductivity between the input 316 and the output 320. In one embodiment the control input F1S 312 comprises a gate node of a FET while the input 316 and output 320 comprise the source or drain of the FET according to the FET's configuration as an N-channel device or a P-channel device.

An additional input, defined herein as an activation control input F1A 324 controls which transistor device(s) within the finger 308 are active or on, meaning are actively switching between conducting and non-conducting mode. By limiting which transistors within the finger 308 are active, current consumption by the finger 308 may be reduced during periods of low current demand. During periods of low current demand, less than all of the transistors that comprise the finger 308 are active. During high current demand, most or all of the transistors of the finger 308 are active thereby increasing output current capability for that finger.

The DC-DC converter may include multiple other fingers 308B through 308M, wherein M is any integer number. One or more, or all, of these other fingers may be similarly configured and include an input, output, and control inputs for switching control input and activation control input.

FIG. 5 illustrates an example embodiment of a transistor finger. In this embodiment the block 400 is contemplated to replace a single large transistor within a DC-DC converter, such as for example a FET device having drain, source and gate terminals. This is but one possible configuration and it is contemplated that in other embodiments other configurations and embodiments are possible.

In this example configuration, the finger 400 includes an input 404, an output 408, such as may comprise a source and drain of a FET. A transistor control input 412 is provided as shown as may represent a gate terminal of a FET. Instead of the input 404, output 408, and control input 412 connect to only a single large transistor, the input 404 connects to a first transistor 416, a second transistor 420, up to an Mth transistor 424, where M is any integer number. The output terminal is also connected to each transistor device 416, 420, and 424 as shown. The output currents from the transistors 416, 420, 424 are summed at the output node 408.

The transistor control input, such as gate terminal connects to the first transistor 416 and a switch 430. A signal on the control input 412 controls the operation of the first transistor 416 and subject to the position of the switch 430, the signal on the control input 412 may optionally be passed to the second transistor 420. If passed to the second transistor, the second transistor 420 switches concurrently with the first transistor 416 thereby increasing current output, which is the combined current output from both the first and the second transistor 416, 420.

Alternatively, if the switch 430 is maintained in the open position, the control signal is only presented to the first transistor 416 and the only output current is from the first transistor. If the switch is maintained closed, the second transistor 420 does not consumer power as a result of charging its gate capacitance, which in turn increases power efficiency when the first transistor 416 is capable of sourcing all the current demanded by the load. If the load demands additional current, the switch 430 may be toggled to the closed position, thereby presenting the control input 412 to the second transistor 420. This increases the current presented to the load in response to the demand. Power efficiency is maintained high because both transistors 416, 420 are operating at or near maximum current capacity.

This arrangement may be repeated up to and including M transistors 424 and M−1 switches 434 to match the number of active transistors to provide the current demanded by the load. As additional current is demanded, additional transistors are switched into operation by toggling a switch 434 to present the control signal to the transistor 424, thereby forcing the transistor 424 to periodically switch into active or conductive state to thereby present current to its output which is summed with the current from other transistors on output node 408. In this way, only the transistors which are necessary to source sufficient current to the output 408 to meet the load demand are active. This maintains in an inactive state any transistor which is not required to meet the load current requirements. This in turn reduces power consumption during periods of less than maximum load due to the avoidance of gate capacitance charging and any another similar power consuming event.

It is also contemplated that one or more additional switches may be presented at other locations within the system shown in FIG. 5. For example, one or more switches may be presented in the input path before one or more of the transistors 416, 420, 424 to selectively control when the input is connect to a transistor. Likewise, one or more switches may be placed in the output path between the transistors 416, 420, 424 and the output node 408.

To control the first switch 430 up to and including M−1 switches 434, control logic or processor 440 is provided. Any type of control device may be utilized to control the switches 430, 434. In FIG. 5, the switches are responsive to an input from a current detector 444, which interfaces or connects to the load itself to determine the current demanded by the load. In other embodiments, the load or current demand is known based on which light sources are on and which are off, or which are operating at less than full brightness. This information may be from an image processing processor which also controls the drivers and processes image data.

In one embodiment the one or more DC-DC converters and one or more drivers are integrated into the same integrated circuit and as a result the output current is thus accessible within a single integrated circuit. In such an embodiment, a control signal which determines driver output, and hence light output, may be utilized within the same integrated circuit to concurrently control the driver output current and match the number of active transistor devices within the DC-DC converter to the load.

Mathematically, these principles can be expressed as follows. The DC losses due to the power MOS switches (transistors) can be expressed as:

$$P_{loss,DC} = R_{on} * I_{rms}^2$$

where $R_{on}$ is the power transistor switch on-resistance and $I_{rms}$ is the root-mean-square value of the current flowing into the transistor. The on-resistance can be expressed as a function of the power MOS number of fingers $N_{finger}$ (for a fixed overdrive voltage) as:

$$R_{on} = R_{on,finger} / N_{finger}$$

where $R_{on,finger}$ is the on-resistance of the power MOS transistor finger.

The AC losses are given by:

$$P_{loss,AC} = C_{gate,sw} * V_{in}^2 * f_{sw}$$

where $C_{gate,sw}$ is the total parasitic capacitance related to the gate of the power MOS switches, $V_{in}$ the input supply voltage and $f_{sw}$ the converter switching frequency. The parasitic gate capacitance of the power switches can be expressed as:

$$C_{gate,sw} = C_{gate,finger} * N_{finger}$$

where $C_{gate,finger}$ is the total parasitic capacitance related to the single finger gate of the power transistor.

Therefore, while the DC losses decrease, increasing the number of active power MOS switch fingers or transistors within a finger, the AC losses increase. Thus, for a particular value of the output current and input supply voltage, the total power switch losses can be minimized choosing a number of power MOS transistor fingers $N_{finger}$ for which the DC losses value and the AC losses value are the same. Then, a dynamic sizing of the $N_{finger}$ would minimize the losses at different values of the output current.

For that reason, dividing the power MOS switches in M parts, that can be driven separately, and using a given number of parts depending on the output current, the power efficiency can be sustained even at light-load conditions keeping the balance between AC and DC power transistor losses. In addition, in this way, even the total power consumption of the switch driver circuits is optimized dynamically. On the other hand, this approach requires a precise monitoring or some level of input of the output current, i.e. the load demands.

In one embodiment, the output current value is known by the driver and the output current information is used, without additional precise current sense circuit, to decide how many power switch parts, such as transistors, or transistor fingers, have to be turned on. In addition and in one embodiment, to optimize the total losses even with respect to the supply voltage, all the power switch segments are turned on only in boost mode. In one embodiment, the power switch has been divided in 4 equal parts leading to 3 output current transition points or threshold points. The transition points or threshold points are defined as different loads, expressed as current draw, which trigger activation deactivation of a greater number or fewer number of transistor or fingers. In other embodiments a different number of divisions and output current transition points may be utilized.

Figure 6:
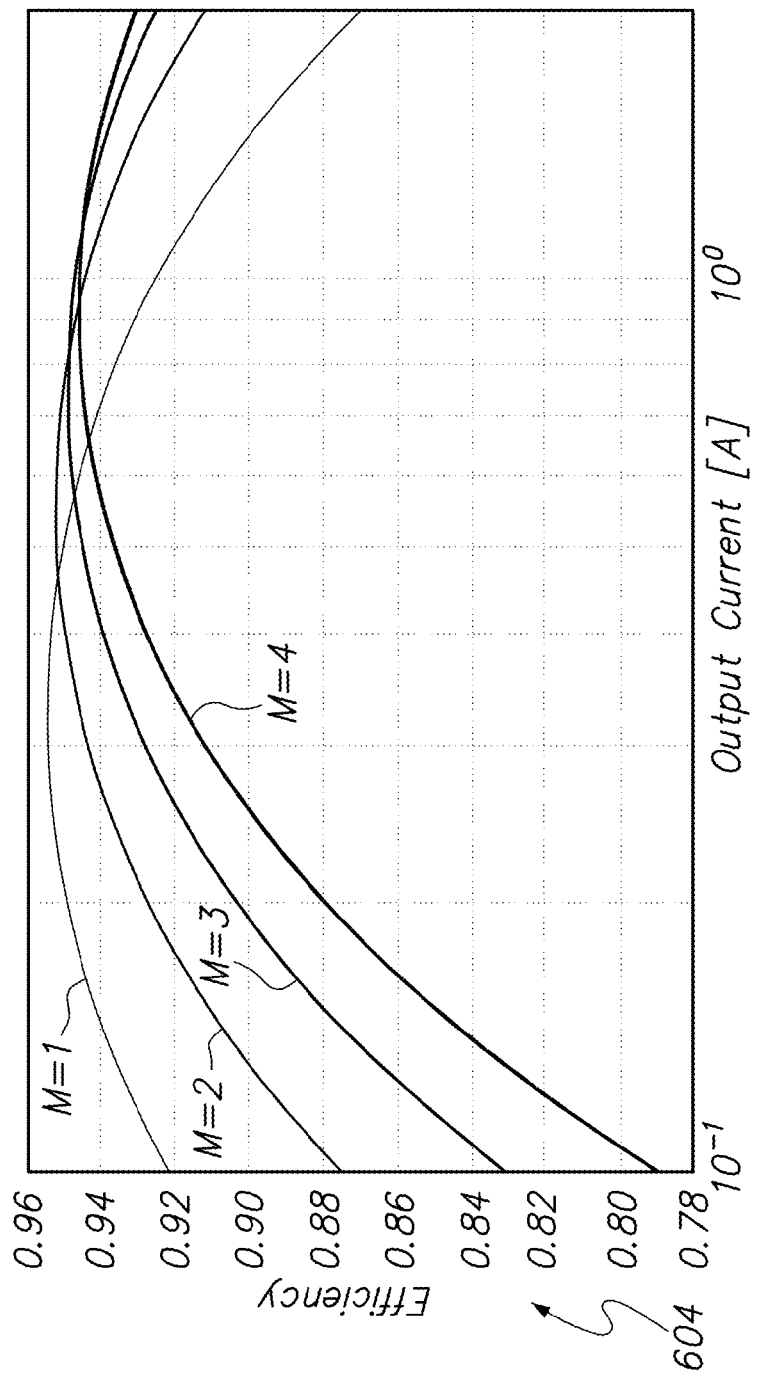
FIG. 6 illustrates a plot of DC-DC converter efficiency in relation to the number of transistors or fingers which are active.

FIG. 6 illustrates a plot of DC-DC converter efficiency in relation to the number of transistors or fingers which are active. The vertical axis 604 represents efficiency while the horizontal axis 608 represents current output from the DC-DC converter, which is related to current to the load. The plots shown M=1, M=2, M=3, and M=4 correspond to power efficiency for a different number of active transistors or fingers. In this example plot, M represents the number of transistors or fingers which are active. At low load condition, only one transistor or finger is active and hence M=1. Only one transistor or finger is required to meet the low current demand. As can been seen from FIG. 6, efficiency is greater for a lower output current than if all transistor or devices were active, represented by plot M=4. As the output current increases the number of active transistors or devices is increased to meet load demand. This does not degrade power efficiency because the number of active transistor or fingers is matched to the load, i.e. output current, to maintain maximum efficiency.

It is contemplated that the output current or load demand may be compared to a transition or threshold and the results of this comparison determines how many of the transistor or fingers are active. Different transitions or threshold may exist for activating a transistor or finger than for de-activating the same transistor or finger. Although shown with M equal to 4, it is contemplated that M may be any integer value of greater than two.

Mode Selection Strategy

Figure 7:
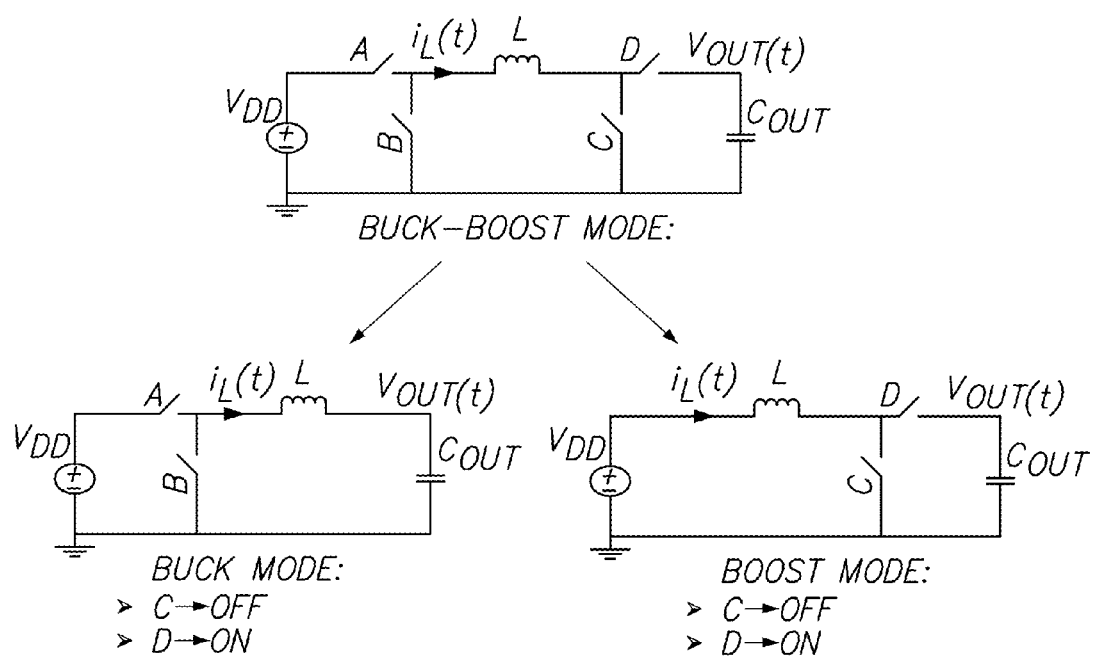
FIG. 7 illustrates an example buck-boost converter with switch control.

FIG. 7 illustrates an example buck-boost converter with switch control to establish the buck-boost converter in either buck mode or boost mode. In this circuit a voltage source $V_{DD}$ has a positive terminal connected to switch A. Switch A has an opposing terminal connect to switch B and an inductor L. The opposing terminal of inductor L connects to switch C and switch D. The opposite terminal of switch D connects to a capacitor $C_{OUT}$. The switches A-D correspond to the FET switches in the DC-DC converters shown in FIG. 3. By selective control of the switches, the DC-DC converter outputs a voltage $V_{OUT}$ across the capacitor $C_{OUT}$.

As shown in the simplified circuit diagram of FIG. 7, the non-inverting buck-boost converter can be turned in a conventional buck converter (switching the power switches A and B while keeping C always off and D always on) or in a boost converter (switching the power switches C and D while keeping B always off and A always on). In this way, the converter can be configured to work in each mode depending on the input voltage presented to the converter and the output voltages required to be output by the converter. This capability leads to several advantages.

First, when the converter is working in buck or in boost mode, the AC losses are reduced since just two of the four power switches are switching. In addition, the switching noise and the current spikes through the power supply pads and the bonding wires associated with the converter are reduced.

Second, working in boost mode leads to a lower steady-state duty cycle with respect to the equivalent buck-boost mode operating point, pushing a right-half-plane (RHP) zero to a higher frequency, allowing a higher closed-loop cut-off frequency and decreasing the inductor current and output voltage ripples. In addition, during the transients the converter can switch between different modes, which in turn decreases the response time.

Implementing a configurable buck-boost converter is not however without drawbacks. Such a configuration requires a mode detection circuit configured to detect the preferred mode of operation and to generate switch control signals. This leads to system complexity and, if not designed with accuracy may lead to the spurious "ping-pong" or unwanted fluctuation between modes.

The converter, or its associated control circuitry or logic, needs to detect the best operating mode by comparing the output voltage of the loop filter with some mode bound thresholds and then generate the proper PWM (pulse width modulation) control waveform by comparing the output voltage of the loop filter with the saw-tooth waveform corresponding to the operating mode, as shown on FIG. 7. The ability to detect the best mode of operation (between buck, buck-boost and boost mode) and the PWM control waveform generation strategies affect critically both the converter dynamic and static performance.

In one configuration control logic or a processor receives one or more loop filter voltages and performs comparison or analysis in relation to thresholds to generate control waveforms. Such a configuration may also include a reference signal generator, waveform generator, signal generator, and/ or comparator. U.S. Patent Publication US 2008/0303499 published on Dec. 11, 2008, which is incorporated herein by reference, provides several example switching regulators which may be adapted for use to implement the switch control strategy described herein. It is also contemplated that other switching regulators, which execute the switch control strategy described herein, may be utilized.

FIG. 8A illustrates an example embodiment of compensation network and error amplifier arrangement configured to generate a control signal. This is one example embodiment of a circuit arrangement configured to generate a control signal $V_c$ and as such it is contemplated that other configurations may be implemented to generate a control signal.

In this example embodiment, an input signal $V_{out}$ 904 is presented to a compensation network 908. The compensation network 908 may comprise a network of one or more resistors, capacitors, or inductors configured to scale or otherwise modify a voltage $V_{out}$. In this embodiment the voltage signal $V_{out}$ corresponds to the voltage across the capacitor $C_{out}$ shown in FIG. 7. The compensation network 908 may also comprise one or more active devices in addition to or instead of passive elements.

The output of the compensation network 908 connects to a negative input of an error amplifier 916 as shown, and to the output of the error amplifier. The positive terminal of the error amplifier 916 receives an input 912 representing $V_{bg}$, which is a reference voltage used to generate the output control voltage $V_c$ on output 920. The $V_{bg}$ voltage may represent a band gap voltage but in other embodiments the reference voltage may represent other values.

In operation, the circuit of FIG. 8A compares, using the error amplifier 916, the voltage from he compensation network 908, which is based on the feedback signal $V_{out}$, to the reference voltage $V_{bg}$. The feedback loop established from the output of the amplifier 916 and through the compensation network 908 causes the output of the amplifier to generate the output $V_c$. As $V_{out}$ 904 changes the value of $V_c$ 920 also changes. The output $V_c$ 920 is presented to the circuit shown in FIG. 8B.

FIG. 8B illustrates an example embodiment of a switch control circuit. Hence, the outputs 970, shown as signals A, B, C, and D in FIG. 8B control the switch positions shown in FIG. 7. In this example embodiment, control logic receives input signals from multiple comparators 934, 936, 944, 948, 952. In other embodiments, the configuration adopt a processor based implementation or an active circuit embodiment.

Figure 9:
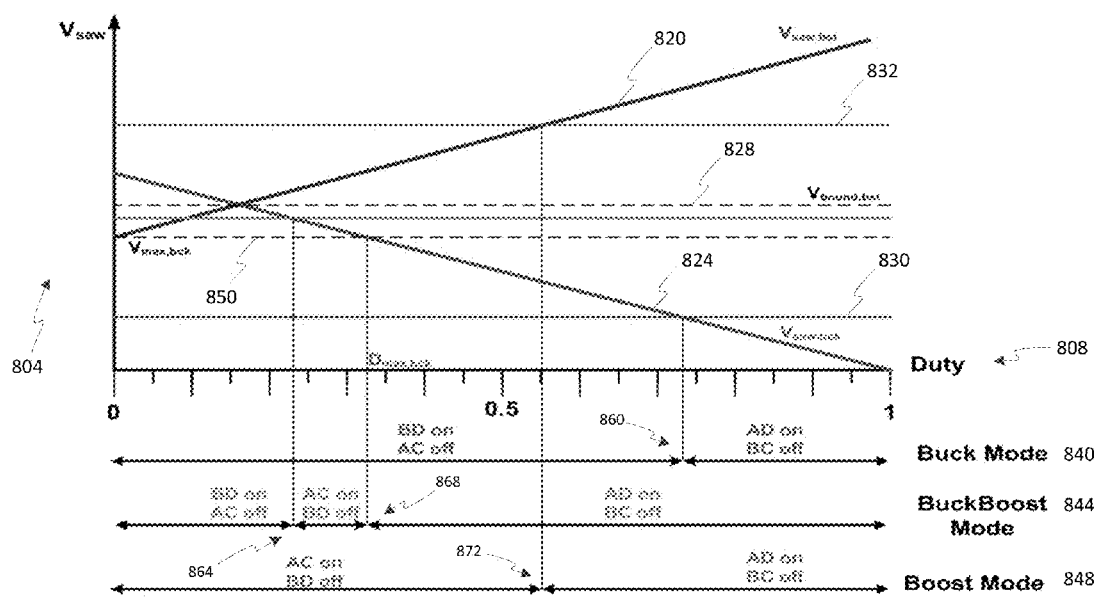
FIG. 9 is an example plot showing the switch control strategy for the switches A-D shown in FIG. 7.

In reference to FIG. 8B, input signals $V_{saw,bst}$ 930 is presented as an input to comparators 934, 936. Comparator 934 also receives as an input the signal $V_c$, referenced in FIG. 8A. Comparator 936 also receives as an input the signal $V_{max,bst}$. The signal $V_{saw,bst}$ 930 is a saw-tooth wave signal with a slope opposite of $V_{saw,bst}$. The signal $V_{max,bst}$ 940 represents a voltage level corresponding to the maximum duty cycle allowed in boost mode. Examples of these signals are shown in FIG. 9. These signal maybe received from any source, such as but not limited to, a signal generator (not shown in FIG. 8B) The output of the comparators 934, 936 connects to logic circuits 956. Processing by the logic circuit 956 generates an output $D_{bst}$. The signal $D_{bst}$ represents a duty cycle signal, such that $D_{bst}$ is the duty cycle for switches C and D shown in FIG. 7 (boost mode switches). The signal $D_{bst}$ is presented to logic circuits 964 as shown.

The signal $V_{saw,bck}$ 940 is presented to comparators 944 and 948 as shown. The signal $V_{saw,bck}$ represents the saw-tooth wave signal illustrated in FIG. 9. The comparator 944 also receives the signal $V_c$ as an input. The comparator 948 also receives the signal $V_{max,bck}$ as an input. The signal $V_{max,bck}$ represents a voltage level corresponding to the maximum duty cycle allowed in buck mode. In this embodiment, $V_{max,bck}$ sets the transition between buck mode and buck-boost mode, while $V_{max,bst}$ is used to avoid direct connection between the input and the output in boost mode, if the duty cycle becomes one. Basically, $V_{max,bst}$ guarantees that some switching occurs with switches C and D under any conditions.

The output of the comparators 944, 948 connect to logic circuit 950. The logic circuit 950 processes the inputs from the comparators 944, 948 to generate the outputs $D_{bck}$ and $D_{max,bck}$. The signal $D_{bck}$ represents a duty cycle signal for switches A and B (buck mode switches) shown in FIG. 9. The signal $D_{max,bck}$ represents the maximum value for the $D_{bck}$ signal. Both of signals $D_{bck}$ and $D_{max,bck}$ are presented to the logic circuits 964 as shown.

A comparator 952 receives inputs $V_c$ and $V_{bound,bst}$ as shown and generates an output BstMode. The signal $V_{bound,bst}$ represents the voltage at which the $V_{saw,bst}$ signal and the $V_{saw,bck}$ signal intersect, which is shown in FIG. 9. The output BstMode represents or signifies that the boost mode is active or enabled or that this mode is to be enabled. The signal BstMode is presented to the logic circuits 964.

Logic circuits 964 perform processing on the inputs $D_{bst}$, $D_{bck}$, $D_{max}$ and $D_{max,bck}$ and BstMode to generate the switch control signals 970 referenced as A, B, D, and D. These signals A, B, C and D control the switches shown in FIG. 7.

In operation, the circuit of FIG. 8B receives the various input signals at the comparators and performs comparisons between the various inputs described above to generate logic values at the outputs of the comparators, such as logic zero and logic one values. In one embodiment, if the signal presented on the negative input terminal of the comparator is greater than the signal presented on the input on the positive terminal, the comparator outputs a logic zero value. Alternatively, the comparator outputs a logic one value. In other embodiments, other comparator configurations may result in different modes of operation.

The logic circuit 950, 956 and 964 processes the signals input to each respective logic circuit based on the scheme or algorithm shown in FIG. 9 to generate the switch control signals 970 referenced as signal A, B, C, and D. Numerous different logic configurations may be utilized to generate the signals A, B, C, and D and it is within the scope of knowledge of one of ordinary skill in the art to generate these logic circuits. Computer aided design may also aid the in the logic circuit implementation.

FIG. 9 is an example plot showing the switch control strategy for the switches A-D shown in FIG. 7. While this particular switch control strategy is presented in this preferred embodiment it is contemplated that other control strategy may be arrived at without departing from the principles of this innovation.

As shown in FIG. 9, a vertical axis 804 represents $V_{saw}$, while the horizontal axis 808 represents the duty cycle. To aid in understanding, the abbreviation 'bck' represents buck and the abbreviation 'bst' represents boost. A first plot 120 $V_{saw,bst}$ represents the voltage of the saw tooth waveform when in boost mode. A second plot 824 $V_{saw,bck}$ represents the voltage of the saw tooth waveform when in buck mode. A plot of the boundary voltage $V_{bound,bst}$ 828 is defined as the voltage at which the $V_{saw,bst}$ signal 820 and the $V_{saw,bck}$ signal 824 intersect. A voltage level $V_{max,bst}$ represents a lower bound voltage between buck-boost and buck mode, which is also the lowest voltage of the $V_{saw,bst}$ saw tooth waveform.

Below the horizontal axis 808 are switch transition points for the switches A-D for each mode of operation. These switches are referenced in FIG. 7 and the control circuit that generates the switch control signals A, B, C, and D are generated by the circuits of FIGS. 8A and 8B. For buck mode 840, switch B and switch D are on and switch A and switch C are off when the value of the saw tooth waveforms 820, 824 are as shown in FIG. 9. As used herein, the turning on of a switch means that it is actively switching. This state is maintained when in buck mode until the voltage $V_{saw,bck}$ dips below the threshold 830. At this point, the circuit adjusts the switches to establish switch A and switch D as on and switch B and switch C as off.

The circuit may also operate in buck-boost mode 844. In this mode, the switch B and switch D are on and switch A and switch C are off when the value of the saw tooth waveforms 820, 824 are as shown in FIG. 9. This state is maintained until point 864 when the waveform $V_{saw,bck}$ drops below the midway voltage point between $V_{bound,bst}$ 828 and $V_{max,bck}$ 850. Upon this occurrence, switch A and switch C are turned on and switch B and switch D are turned off. This switch state is maintained until the $V_{saw,bck}$ signal voltage drops below $V_{max,bck}$ voltage 850, which occurs at point 868. At this point, switch A and switch D are turned on and switch B and switch C are turned off.

The circuit may also operate in boost mode 848. In this mode, the switch A and switch C are on while switch B and switch D are off when the value of the saw tooth waveforms 820, 824 are as shown in FIG. 9. Upon the waveform $V_{saw,bst}$ exceeds voltage level 832 then the switches are controlled to force switch A and switch D on and switch B and switch C off.

The following describes the strategy in greater detail. To generate the PWM control waveforms, which control the switches A-D for each mode, two symmetric saw-tooth voltage waveforms $V_{saw,bck}$ and $V_{saw,bst}$ which range around the $V_{bound,bst}$ voltage are used. The symmetric approach leads to the same PMW gains $V_{gain,PWM}$ for any operating mode since:

$$V_{gain,PWM}=1/N_{peak2peak,saw}$$

where $V_{peak2peak,saw}$ is the peak to peak voltage of the corresponding saw-tooth waveform. Another advantage of the switch strategy of FIG. 9 is that the process variations affect the two saw-tooth signals in a symmetrical way, without varying the to PWM modulator gain.

In this embodiment two mode bound voltages are used. The bound voltage between buck-boost and boost mode is voltage $V_{bound,bst}$ (which is the crossing point of the two saw-tooth signals) while the bound voltage between buck-boost and buck is voltage $V_{max,buck}$ (the lowest voltage of the $V_{saw,bst}$ saw-tooth signal). Depending on the output voltage value of the loop filter, the corresponding working mode is activated.

If the output voltage of the loop filter $V_c$ is lower than the bound voltage $V_{max,buck}$ (as for the pink-wave case), the converter is working in buck mode and the used saw-tooth waveform is $V_{saw,bck}$. When $V_{saw,bck}>V_c$, switches B and D are on and switches A and C are off, while when $V_{saw,bck}<V_c$, switches A and D are on and switches B and C are off. In buck mode the achievable output voltage values range from ideally zero to $V_{outbck,max}=V_{in}*D_{max,bck}$.

When the output voltage of the loop filter $V_c$ is higher than the bound voltage $V_{max,buck}$ and lower than the bound voltage $V_{bound,bst}$ (as for the green-wave case), the converter is working in buck-boost mode and the used saw-tooth waveform is again $V_{saw,bck}$. When $V_{saw,bck}>V_c$, switches B and D are on and switches A and C are off, when $V_c>V_{saw,bck}>V_{max,bck}$, switches A and C are on and switches B and D are off, while when $V_{saw,bck}<V_{max,bck}$, switches A and D are on and switches B and C are off. In buck-boost mode the achievable output voltage values range from $V_{outbb,min}=V_{in}*D_{max,bck}$ to $V_{outbb,max}=V_{in}*[D_{min,bst}*(1+D_{max,bck}-D_{min,bst})]$.

If the output voltage of the loop filter $V_c$ is higher than the bound voltage $V_{bound,bst}$ (as for the blue-wave case), the converter is working in boost mode. When $V_{saw,bst}<V_c$, switches A and C are on and switches B and D are off, while when $V_{saw,bst}>V_c$, switches A and D are on and switches B and C are off. In boost mode the achievable output voltage values range from $V_{outbst,min}=V_{in}/(1-D_{min,bst})$ to $V_{outbst,max}=V_{in}/(1-D_{max,bst})$.

In order to avoid a "steady state" ping-pong or hunting between different modes, that leads to increased output voltage ripple, the output voltage value ranges are overlapped to avoid discontinuities. Therefore, in operation the following conditions are verified:

$$V_{outbck,max} \geq V_{outbb,min}$$

$$V_{outbb,max} \geq V_{outbst,min}.$$

Since $V_{outbck,max}=V_{outbb,min}$, proper values of $D_{max,bck}$ and $D_{min,bst}$ need to be selected to satisfy the relation $V_{outbb,max} \geq V_{outbst,min}$.

Figure 10:
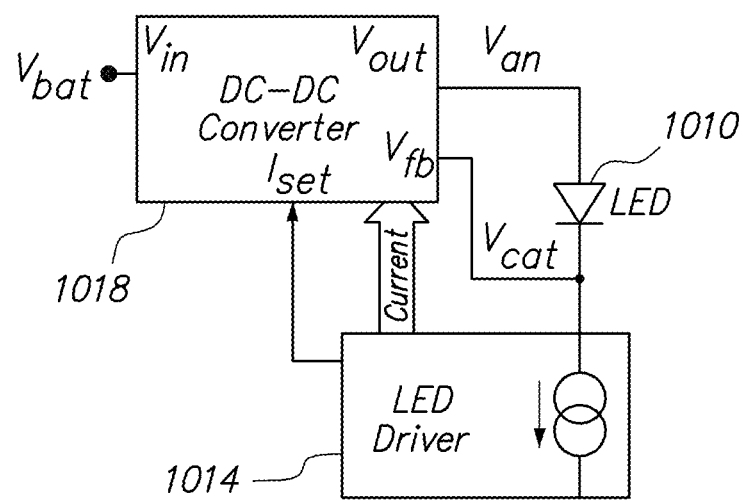
FIG. 10 illustrates an exemplary block diagram of an LED driver.

As discussed above, several emerging portable applications operate best with high-efficiency LED drivers. A typical LED driver is a current source that forces current in the LED as required for achieving the desired light emission. In order to increase the LED driver efficiency, besides controlling the LED current, it is possible to regulate the voltage applied to the LED itself, to minimize the voltage drop across the driver current source and, hence, the power consumption. Depending on the kind of used LED and on the current forced through the LED itself (0.1-2 A in this exemplary embodiment). Hence, on the desired light emission, the voltage required to drive the LED, while maintaining the voltage headroom across the driver current source to the minimum, varies over a wide range (0-5V). Starting from a standard voltage supply in the range 2.7-5.5V, a buck-boost DC-DC converter may then be utilized as shown in FIG. 10. FIG. 10 is a block diagram of an generalized exemplary LED driver 1014 including the LED 1010 (or any light source) and the DC-DC converter 1018. The buck-boost DC-DC converter 1018 includes the LED 1010 in the control feedback loop and provides fast turn-on and load transients (of the order of 20 μs), in order to allow pulsed operation of the LED itself.

Figure 11:
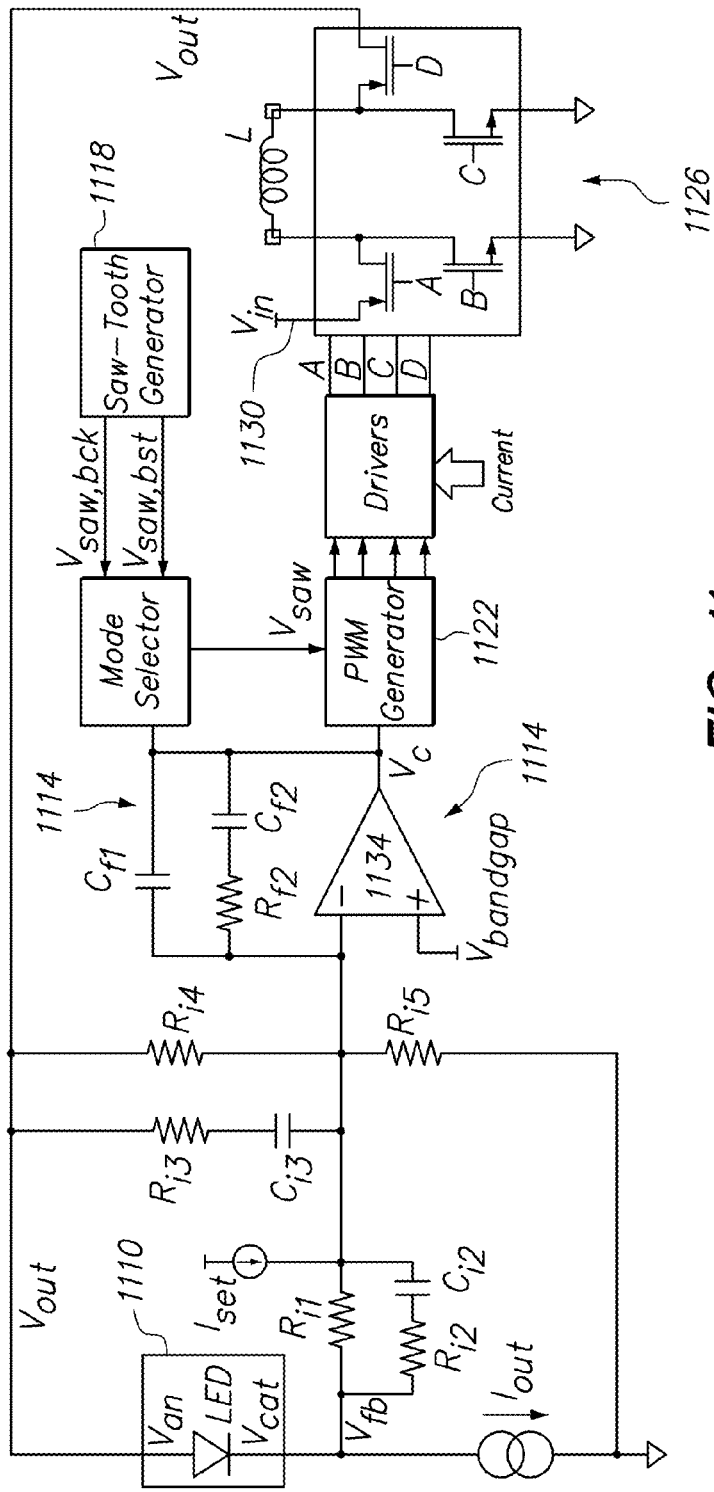
FIG. 11 illustrates an exemplary block diagram of a DC-DC converter.

The detailed block diagram of an exemplary DC-DC converter is shown in FIG. 11. In this example embodiment a cathode voltage of the LED 1110 ($V_{cat}$) is connected to an error processor 1114, which produces the control voltage $V_C$. Voltage $V_C$ is compared with a 2.5 MHz saw-tooth waveform ($V_{saw}$) from saw-tooth generator 1118 for achieving the PWM modulated signals from PWM generator 1122, which drive the power transistors 1126 A, B, C and D in order to produce the output voltage $V_{out}$, connected to the anode of the LED ($V_{an}$) 1110, starting from the input (battery) voltage $V_{in}$ 1130. Stability is ensured by a type III compensation network. The desired value of $V_{cat}$ is selected by injecting a suitable current $I_{set}$ in the compensation network. In this embodiment the operational amplifiers 1134 used for the error processing circuit and for the saw-tooth waveform generators 1118 are based on a folded-cascode architecture.

The DC-DC converter features three different modes of operation, namely buck, buck-boost and boost mode, which are automatically selected based on the value of voltage $V_C$. The automatic mode selection, illustrated in FIG. 9, avoids unwanted or unnecessary switching for $V_{out}$ when $V_{out}$ is much larger or much smaller than $V_{in}$. This reduces the power consumption and, then, increases the efficiency. Basically, for $V_{out} < V_{max,bck}$ the circuit operates as a buck converter (power transistors C and D are not switching), while for $V_{out} > V_{bound,bst}$ the circuit operates as a boost converter (power transistors A and B are not switching). Only when $V_{max,bck} < V_{out} < V_{bound,bst}$ are the four power transistors all switching and the circuit is then operating as a buck-boost converter. In order to maintain the PWM gain constant when switching between modes, two different saw-tooth waveforms with opposite slopes are used, namely $V_{saw,bck}$, used in buck and buck-boost mode, and $V_{saw,bst}$, used in boost mode. The crossing point between the two saw-tooth waveforms identifies the threshold voltage $V_{bound,bst}$. If the slope of the saw-tooth waveforms changes due to process mismatches, voltage $V_{bound,bst}$ remains unchanged, thus avoiding critical discontinuities in the PWM gain.

In DC-DC converters the efficiency is typically determined by the DC losses for large output currents and by AC losses for small output current. DC losses are due to the ohmic behavior of the power transistors, the external inductor ESR and IR drops on the power routing and bondwires. Selection of the proper external component and careful layout should ensure that the DC losses are dominated by the power transistors. AC losses are due to the power required to drive the gate capacitance of the power transistors. The peak value of the efficiency is achieved for the current value for which these two contributions are equal. This current value depends on the size of the power transistors, which is fixed or determined by design. Therefore, in order to increase the light-load power efficiency, low-power control modes as PFM or skip pulse mode are activated when the output current falls below a given threshold. The introduction of these additional operating modes, however, increases the complexity of the system and may introduce unwanted ripple in the output voltage. In the proposed DC-DC converter disclosed herein another approach has been adopted and disclosed for improving the light-load efficiency, exploiting the fact that the output current value is actually set by the LED driver and, hence, known a-priori. With this information, delivered to the DC-DC converter by the LED driver in digital form, the size of the power transistors is dynamically adjusted, in order to establish the peak of the power efficiency at the desired current value. The dynamic adjustment of the power transistor size is achieved by splitting the devices and the corresponding digital drivers in four equal modules or fingers. This is discussed above in greater detail. Based on the current information delivered by the LED driver or a controller, these modules or fingers are turned on or off, achieving the desired effect and reduced power consumption.

Figure 12:
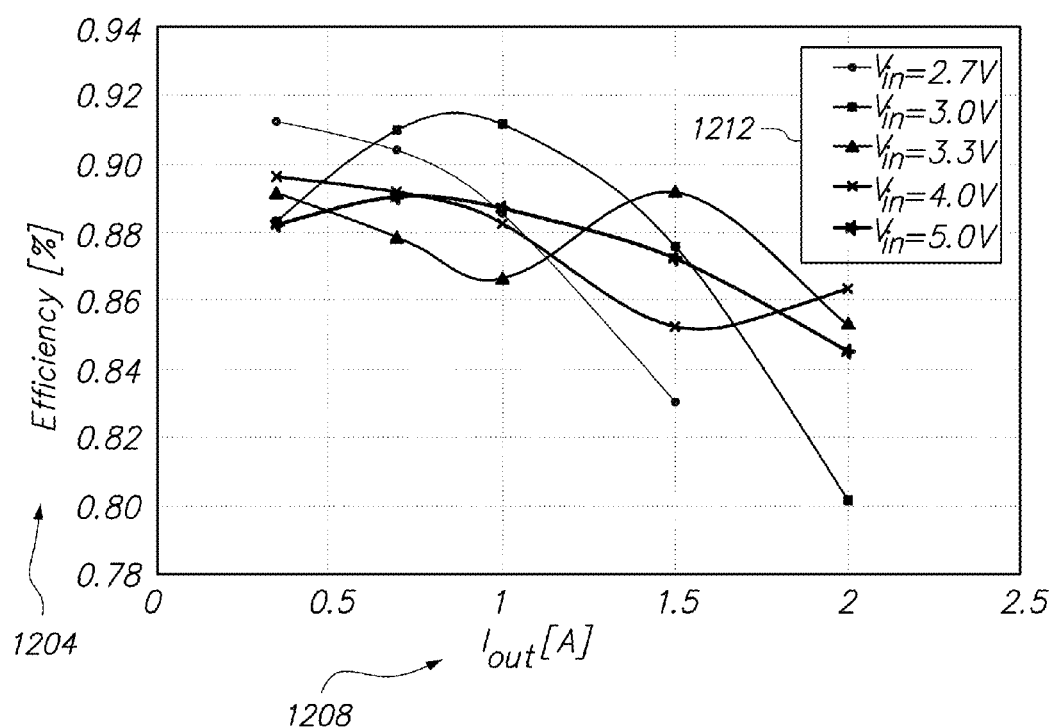
FIG. 12 illustrates a plot of measured DC-DC converter efficiency as a function of $I_{out}$ for different values of $V_{in}$.

In this exemplary embodiment the proposed DC-DC converter has been fabricated in a 0.18 μm CMOS process with 5V option. The chip area, dominated by the power transistors, is 1.65×2.5 mm$^2$, including pads. The DC-DC converter has been characterized with different LEDs, operated at different current values. For the measurements we used a 1 μH off-chip inductance. FIG. 12 is a plot of the obtained efficiency 1204 as a function of the output current ($L_{out}$) 1208 for different values of the input voltage ($V_{in}$) identified in the plot key 1212. As a result of the dynamic sizing of the power transistors and to the automatic mode switching, the efficiency is maintained reasonably high over the whole $L_{out}$ range. The peak efficiency obtained is equal to 91%. The measured line regulation is lower than 0.2%/V over the whole output current range, while the load regulation in this particular application is not as meaningful in this embodiment because the voltage drop across the LED and hence $V_{out}$ changes with $I_{out}$. The output voltage ripple is less than 10 mV. The transient response of the DC-DC converter is fast for a red-green transition, i.e. when a green LED is replaced with a red LED with the same current (1.9 A). For example, the output voltage of the DC-DC converter, because of the different voltage drop across red and green LEDs, switches from 2.9V to 3.96V in less than 10 μs. By contrast, the output current switches from 1.9 A to zero and back to 1.9 A in less than 20 μs, thus allowing pulsed operation of the LEDs and switching among LEDs of different colors.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A DC-DC converter comprising:
    an input configured to receive an input signal;
    an output configured to present an output signal at a different voltage than the input signal;
    at least one inductor;
    at least one capacitor;
    two or more DC-DC converter switch elements forming the DC-DC converter such that at least one of the two or more DC-DC converter switch elements include two or more transistor fingers, such that at least one of the two or more transistor fingers includes a switch, each switch having an input, an output, and a control input, the control input configured to receive a control signal to control the switch; and
    an activation controller connected to the switch, the activation controller configured to present a control signal to the control input of the switch, the control signal determining which of the two or more transistor fingers are active or non-active.

2. The DC-DC converter of claim 1 wherein the activation controller is responsive to a load current drawn from the DC-DC converter.

3. The DC-DC converter of claim 1 wherein each of the two or more transistor fingers are cascaded thereby having outputs connected to inputs of subsequent transistor fingers.

4. The DC-DC converter of claim 1 further comprising at least one switch configured to receive the control signal and responsive to the control signal selectively provide an activation signal to at least one of the two or more transistor fingers.

5. The DC-DC converter of claim 1 further comprising an optic signal generator connected to the output, the optic signal generator drawing a current to create a variable load.

6. The DC-DC converter of claim 1 further comprising a current detector configured to detect a load current and provide a load current indicator signal to the activation controller.

7. A DC-DC converter comprising:
    an input configured to receive an input signal at a first voltage;
    an output configured to present an output signal at a second voltage, the second voltage different than the first voltage;
    at least one inductor;
    at least one capacitor;
    a DC-DC converter switching system, comprising two or more switches, configured to control the second voltage presented at the output, such that at least one of the two or more switches of the DC-DC converter switching system comprises:
    two or more transistor fingers, such that each transistor finger includes one or more transistors, each of the one or more transistors having a transistor input and a transistor output, and each transistor finger has one or more finger switches and at least one transistor receives the input signal;
    an controller connected to at least one of the one or more finger switches, the controller configured to control which of the one or more transistors in the one or more transistor fingers are active or non-active by providing control signals to the one or more finger switches.

8. The converter of claim 7 wherein the two or more switches includes a switch input, a switch output, and a control signal input such that the two or more switches are configured to receive a switch control signal from the controller, and responsive to the switch control signal, present a transistor finger control signal at the switch input to the switch output.

9. The converter of claim 7 further comprising a current detector configured to provide a load demand signal to the controller, the load demand signal determining the number of transistor fingers which are active.

10. The converter of claim 7 further comprising a junction connecting to an output of each transistor finger.

11. The converter of claim 7 wherein the controller is configured activate additional transistor fingers in response to increased load.

12. A method for providing an output signal in response to a variable load comprising:
    monitoring a load to establish a load demand signal;
    processing the load demand signal to generate one or more switch control signals;
    presenting the switch control signals to one or more switches, at least one of the one or more switches formed from two or more transistor fingers;
    responsive to the one or more switch control signals, selectively switching a transistor finger activation signal to selectively enable one or more transistor fingers such that as the load increase a greater number of transistor fingers are enabled;
    responsive to the transistor finger activation signal, activating the one or more transistor fingers receiving the transistor finger activation signal to generate one or more transistor finger output signals;
    receiving and combining the one or more transistor finger output signals at a common node to create an output signal; and
    presenting the output signal to the load.

13. The method of claim 12, further comprising detecting a current at the load with a current detector and processing a current detector output to generate the one or more switch control signals.

14. The method of claim 12, wherein a processor or control logic generates the one or more switch control signals.

15. The method of claim 12, wherein the load comprises a light emitting diode or a laser.

16. The method of claim 12, wherein the transistor finger activation signal comprises a signal that activates a transistor finger and when presented to one transistor of the one or more transistor fingers activates the one transistor to increase power of the output signal.

17. The method of claim 12, wherein in response to increased load demand, additional transistor fingers are activated.

* * * * *